Patented Mar. 11, 1924.

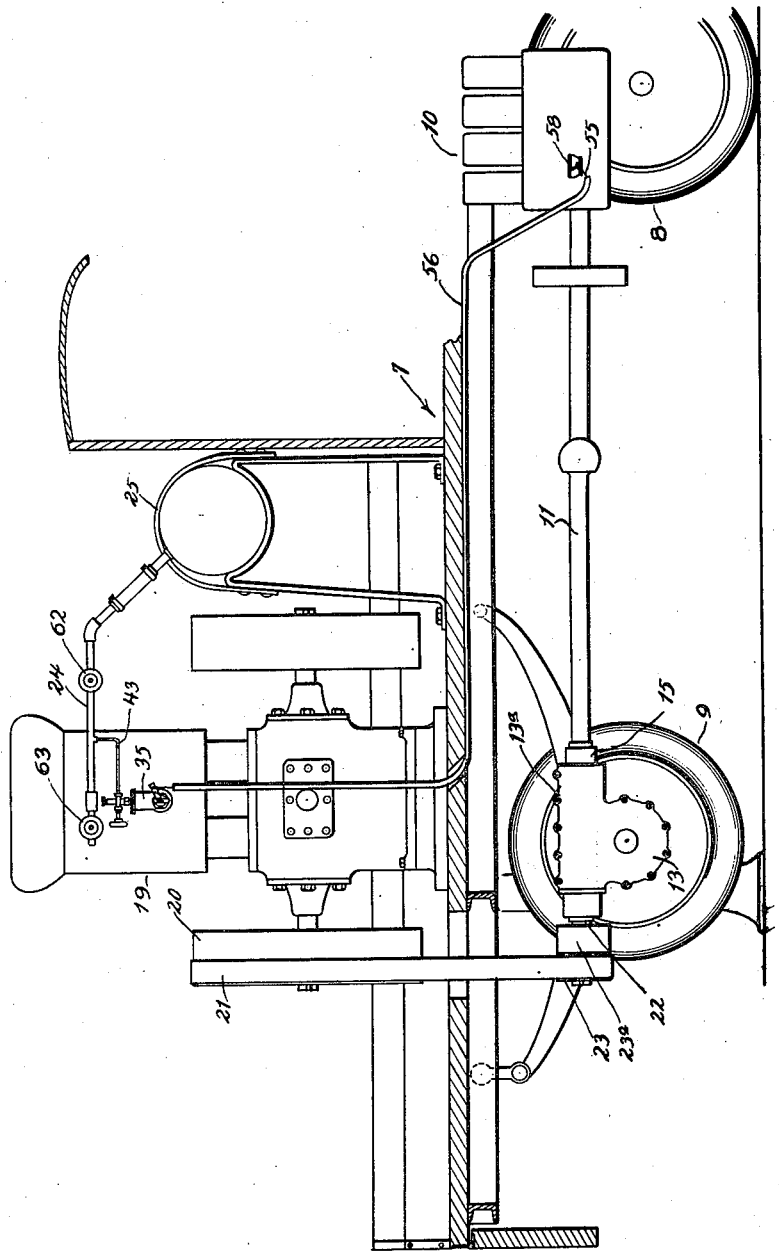

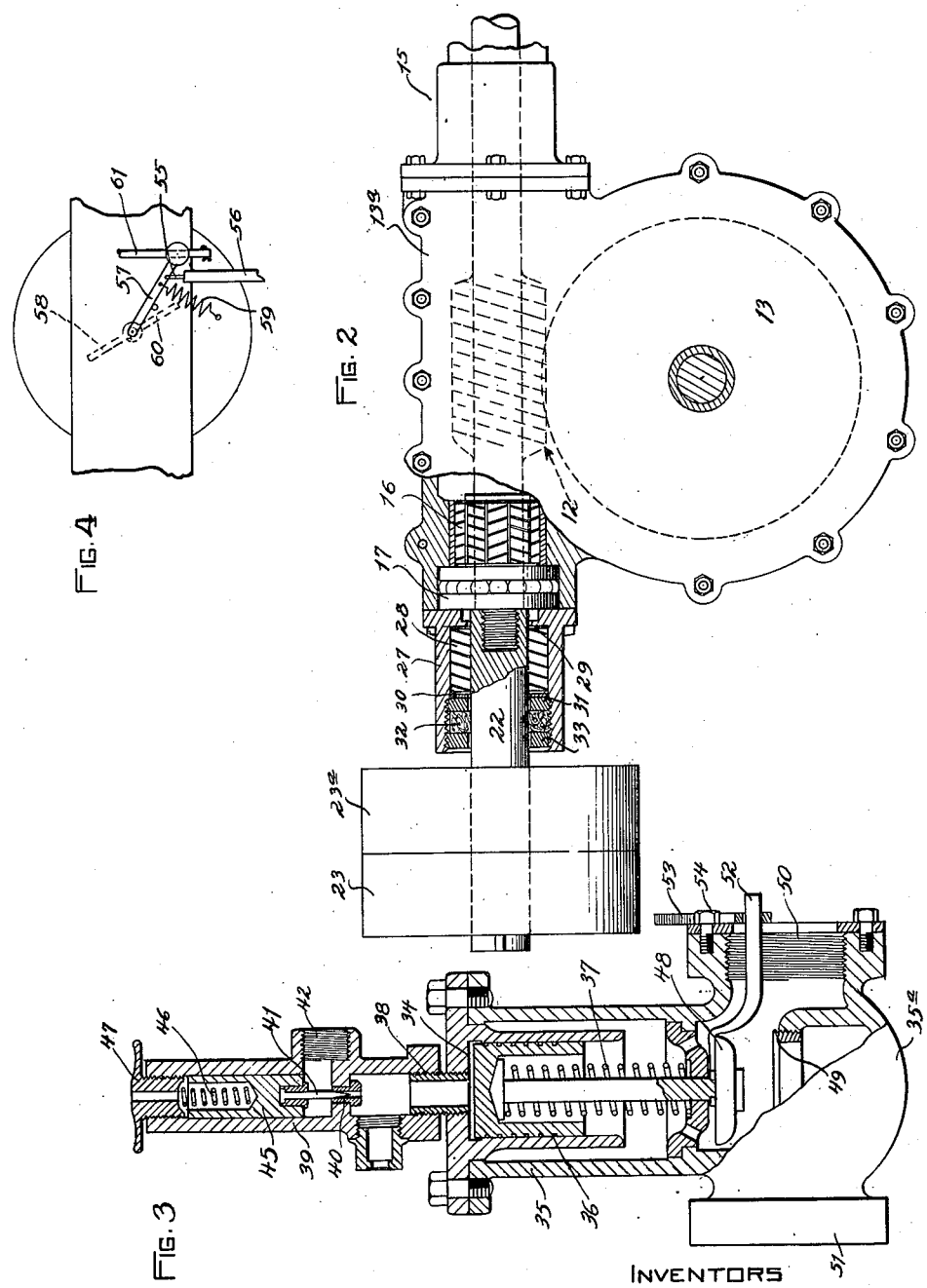

1,486,133

UNITED STATES PATENT OFFICE.

LA RUE B. ELLIOT AND JAMES P. KILROY, OF CHICAGO, ILLINOIS.

PORTABLE COMPRESSOR UNIT.

Application filed May 13, 1922. Serial No. 560,572.

*To all whom it may concern:*

Be it known that we, LA RUE B. ELLIOT and JAMES P. KILROY, citizens of the United States, residing at Chicago, in the county of Cook and State of Illinois, have invented a new and useful Portable Compressor Unit, of which the following is a specification.

The object of this invention is to produce a means whereby a motor vehicle, such as a truck of the Ford type, may be converted at a relatively small cost into an efficient power unit for driving an air compressor or other device mounted upon the truck body for the purpose of transportation.

In carrying out our invention we take the power directly from the main drive shaft, and for this purpose provide a stud shaft in the nature of an auxiliary or extension shaft which is adapted to receive a driving element such, for example, as a pulley. This, it will be apparent, is much superior to the common practice of taking the power from one of the wheels. In the latter case the power from the motor is transmitted through the differential including reduction and equalizing gears. Consequently it is necessary in case the device to be driven must be operated at a high rate of speed to operate the actuating motor at a proportionately higher rate of speed which, of course, is objectionable because of the wear and tear, and strain generally, thus imposed upon the motor. Moreover, a strain is imposed upon the equalizing gears for which they were not designed and which they were never intended to bear. In the use of motor vehicles, therefore, as power units in the manner referred to, the incidental wear upon the motor and transmission parts is so great as to render this method of transmitting power decidedly objectionable.

One aim of the invention has been to provide an extension means which is in the nature of an attachment which may be applied to vehicles already in existance by simply removing parts of the drive means and differential housing, and substituting therefor a bearing member capable of effectively supporting the extension shaft which is made rigid with the main shaft.

In the accompanying drawings we have shown our invention as embodied in a truck of the Ford type, carrying a suitable air compressor to which power is delivered from the vehicle motor. Heretofore it has been customary, in order to provide a portable compressor power unit, to mount the compressor together with a special actuating motor upon the body of a trailer vehicle to be moved about from place to place as may be desired by another motor vehicle or tractor. Such units are necessarily, by reason of their special construction, very expensive to manufacture, their cost running into thousands of dollars depending upon the capacity thereof. In the case of units designed for high capacity, the motors employed are in the nature of those employed in motor vehicles, of high power and variable speed, whereas in the case of the smaller compressor units, a two-cycle motor having a very limited speed range is employed.

We have found that by mounting a compressor upon the truck body and operatively connecting the same with the main motor shaft in the manner above outlined an exceedingly efficient portable compressor unit is obtained. The actuating power is of the character obtained in the case of units designed for high capacity, but the expense is exceedingly small as compared to the cost of the high capacity unit. At the same time the unit is rendered more readily portable than in the case of a trailer, enabling the transportation of the compressor unit from place to place rapidly and hence in a much more economical manner. This is of substantial importance in case the air compressor unit must be moved frequently to and from widely separated and remote points as is the case, for example, of a compressor unit employed in the streets of a large city for supplying air to pneumatic tools employed in various parts of the city for breaking up pavements preliminary to the laying of gas mains and the like.

Another object of our invention is to provide a means for controlling the vehicle motor, which will enable the latter to respond automatically to variations in the load to which the compressor may be subjected under varying conditions of use.

The objects and aims of the invention above set forth, together with other and ancillary advantages, are attained by the construction and arrangement shown in the accompanying drawings forming part hereof, but it is contemplated that various changes in form, construction and arrangement of the parts illustrated and described herein may be made by those skilled in the art without departing from the spirit and scope of the invention as expressed in the appended claims.

Figure 1 of the drawings is a fragmentary side view, partially diagrammatic, of a motor vehicle embodying our invention. Fig. 2 is a fragmentary elevation section illustrating the manner of connecting the extension shaft to the main shaft. Fig. 3 is a vertical sectional view of a portion of the motor control mechanism. Fig. 4 is a fragmentary detail view illustrating the manner of connecting the control mechanism with the engine throttle valve.

Referring first to Figure 1 of the drawings, 7 designates generally the truck body of a motor vehicle to which our invention is applied and which is supported upon front wheels 8, rear wheels 9 and is propelled from place to place through the medium of a motor 10 transmitting power to the rear wheels 9 by a shaft 11 and gearing 12. 13 designates the differential housing which has an upper elongated portion 13ª enclosing the drive worm 14. At the forward end of the housing there is provided a bearing 15 and at the rear end a similar bearing 16 and a rear thrust bearing 17. The motor vehicle thus generally described is of the well known Ford type wherein the worm 14 is located upon the upper side of the worm wheel 18 with which it meshes, the end of the shaft rearwardly of the worm 14 extending beyond the thrust bearing 17. Normally such rear end of the shaft 11 is provided with a lock nut (not shown) which serves to hold the thrust bearing in position, and this lock nut together with the rear end of the shaft is enclosed by a cap (also not shown) forming the rear end of the portion 13ª of the housing.

19 designates generally a compressor of a suitable type mounted upon the truck body and operatively connected through the medium of a fly wheel 20 and belt 21 with the rear end of the shaft 11, the latter being in accordance with our invention provided with a rigid extension 22 carrying a pulley 23 or other power-transmitting element for this purpose. This means will be presently more fully described.

The compressor 19 is connected through the medium of a pipe 24 with a storage tank 25 to which air is delivered in the operation of the compressor by the motor 10.

In carrying out our invention we remove the rear end cap, above referred to, of the housing 13ª and also the lock nut which normally serves to retain the rear thrust bearing in position upon the shaft. In place of the nut, we provide a shaft of a diameter somewhat larger than the shaft 11 and having at its forward end an internally threaded bore 26 which is adapted to receive the screw-threaded rear end of the shaft 11. By reason of its larger diameter than said shaft, the forward end of the stud shaft 22 forms a shoulder engaging with the thrust bearing to retain it in position upon the shaft. At its rear end, the stud shaft 22 carries the pulley 23 or other suitable power transmitting element, which pulley is made fast upon the shaft as by being keyed thereon. We may also provide a second pulley 23ª, loose upon the shaft, onto which the belt 21 may be shifted when it is desired to disconnect the compressor from the motor, as when the unit is to be moved from one point to another.

In addition to the standard bearings provided by the vehicle manufacturer for the shaft 11, we preferably provide a bearing for the extension or stud shaft 22. To this end in place of the end cap, which was removed from the housing 13ª, we substitute a sleeve 27 flanged at its forward end and provided with apertures in a manner similar to the cap removed so as to be capable of being secured to the housing by means of the bolts previously employed for securing the cap in place. This sleeve is made of substantial diameter and encloses a suitable bearing 28. The forward end of the sleeve also has an inturned flange which forms a seat for a washer 29 against which the forward end of the bearing 28 engages. The rear end of the bearing likewise engages with a washer 30 and is held in position by means of a screw threaded ring 31. 32 is a packing of suitable material in the form of a ring surrounding the extension shaft 22 and clamped in position against the ring 31 by a second ring 33.

It will be apparent that the means thus provided in addition to affording a bearing for the stud shaft also prevents the escape of the lubricant from the rear end of the housing. The construction moreover is exceedingly simple, and is capable of being quickly and easily applied without the exercise of special skill, it being the practice to manufacture the sleeve and associated parts in the form of a completed or assembled unit which is in the nature of an attachment capable of being applied by the user.

In the use of the compressor it frequently happens that the load imposed thereon varies from time to time as for instance when one or more of a plurality of pneumatic tools are cut in or out. Obviously it is desired to maintain in the storage tank 25 a predetermined pressure at which the tools will operate efficiently, and the actuating motor is set to operate at a speed to maintain such pressure. When, however, the load varies the tendency of the motor is to race or slow down as the case may be, with a resulting inefficiency in the operation of the unit. For the purpose of maintaining the pressure in the tank substantially constant under varying load conditions, we provide a governing means which in addition to controlling the air inlet to the compressor also controls the amount of fuel passing to the motor.

Referring now to Figs. 1 and 3, such governing means comprises essentially a chamber having a piston therein and communicating with the air storage tank whereby the pressure in the latter actuates the piston and the piston in turn actuates a valve for controlling the flow of air to the compressor. Thus a chamber 34 is provided within a casing 35 and has a piston 36 therein normally forced to the upper part of the chamber by means of a coiled expansion spring 37. The chamber communicates with the air storage tank 25 through the medium of a bushing 38 and an elongated upright hollow casing 39 having a port 40 therein arranged to be controlled by a needle valve 41. Said casing has an inlet 42 which is connected by means of a tube 43 with the pipe 24 leading from the compressor outlet to the tank. In the upper portion of the casing 39 is a piston 45 which carries the needle valve 41, said piston being pressed downwardly by means of a spring 46 whose tension is arranged to be adjusted by a nut 47.

It will be apparent that when the pressure in the storage tank exceeds a predetermined amount it will act upon the piston 45 opening the port 40 by the operation of the needle valve 41 and admitting pressure to the piston chamber 34. The downward movement of the latter causes a valve member 48 to move toward a seat 49 provided in a lower horizontal portion 35$^a$ of the casing 35. One side of the casing 35$^a$ has an air inlet opening 50 and the other side has an outlet 51 which communicates with the compressor inlet.

For the purpose of controlling the flow of gaseous fuel to the motor we utilize the movements of the valve member 48 by the piston 36. Thus we provide an arm 52 secured at its inner end upon the stem of the valve 48 and bent so as to extend outwardly through the inlet opening 50. A lever 53 is pivoted upon the casing as at 54 and one end is connected with the free end of the arm 52. The opposite end of said lever is connected by means of a wire 55, sliding in a flexible tube 56, with an arm 57 (Fig. 2) which controls the throttle valve 58 of the motor. A coil tension spring 59 normally tends to swing the arm 57 against a stop 60 to determine the idling position of the throttle, and an operating rod 61, by means of which the throttle is manually actuated, has a limited sliding connection with the arm 57 such that said arm and the throttle may be actuated by the wire 55 without moving the rod 61.

It will be observed that when the pressure in the storage tank builds up beyond the predetermined amount, the valve member 48 is actuated to restrict the flow of air to the compressor. Simultaneously the wire 55 is moved through the medium of the arm 52 to swing the throttle 58 in a direction such as to restrict the passage for the fuel to the engine. Conversely should the load upon the compressor suddenly be increased so that the pressure in the tank is caused to fall, the valve 48 is moved to admit a greater quantity of air to the compressor, and simultaneously the throttle 58 is actuated to admit a greater quantity of fuel to the engine and thus prevent an undue slowing down or stoppage of the latter owing to the increased load.

It will thus be apparent that whereas we employ a variable speed motor for actuating the compressor, we also provide means for automatically governing the speed of the motor to that necessary at any given time to maintain the pressure within the air tank substantially uniform. The result is that the apparatus as a whole operates with utmost efficiency, the motor being capable of a variation in speed to suit varying load requirements and at the same time being so controlled as to prevent racing or complete stoppage when the load imposed is suddenly lifted or abnormally increased.

The transmission of power, moreover, from the motor to the compressor, is accomplished with utmost efficiency by reason of the direct connection of the compressor with the main shaft. At the same time, while one of the drive wheels of the vehicle is actuated during the operation of the compressor, no load is imposed thereon and therefore it is not subject to any undue strain.

When it is desired to utilize the motor for propelling the vehicle, it is only necessary to disconnect the driving belt from the pulley 23, and in the present instance this is accomplished by shifting it onto the loose pulley 23$^a$. Likewise the unit may be quickly placed in operation when desired.

In order to render it unnecessary to release the pressure from the storage tank before the compressor may be set in operation, we provide preferably a pair of valves in the pipe 24 on opposite sides of the compressor outlet as shown at 62 and 63. The valve 62, it will be seen, when closed prevents the escape of the air from the storage tank, and the valve 63 when opened permits the initial operation of the compressor, the air exhausing to the atmosphere. In practice when the motor is started the valve 63 is opened and the valve 62 closed, and after the motor has gained its momentum the respective valves are gradually opened and closed substantially simultaneously, closing the escape of the air to the atmosphere and establishing communication between the compressor and the tank.

It will, of course, be understood that in order to render the device operative as a power unit, it is necessary to elevate the rear end of the vehicle by jacking up one or both rear wheels although we have found it entirely practicable to elevate one wheel only.

We claim as our invention:

1. The combination with a motor vehicle having a main drive shaft, a housing enclosing the rear end of said shaft and having an open rear end, the rear end of said shaft being externally screw-threaded; of a power attachment comprising a stud shaft having an internally threaded bore at its forward end adapted to receive the screw-threaded rear end of the main shaft, a sleeve arranged to be secured upon the rear end of the housing, and a bearing in said sleeve for the stud shaft.

2. In a power unit, the combination with a motor vehicle having a main drive shaft, a housing for enclosing the rear end of said shaft and having an open rear end, a bearing in the housing for the shaft, the latter having a screw-threaded rear end, of a stud shaft having an internally screw-threaded bore at its forward end adapted to receive the screw-threaded end of the main shaft, said stud shaft providing a shoulder adapted to retain said bearing in position upon the main shaft, and a power drive element fast upon the stud shaft.

In testimony whereof we have hereunto affixed our signatures.

LA RUE B. ELLIOT.
JAMES P. KILROY.